(12) United States Patent
Tuecks (10) Patent No.: US 9,004,979 B2
(45) Date of Patent: Apr. 14, 2015

(54) REPLACEABLE FINE MACHINING MEMBRANE, STATIONARY FINE MACHINING TOOL, AND METHOD FOR PRODUCING A REPLACEABLE FINE MACHINING MEMBRANE

(75) Inventor: Roland Tuecks, Aachen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 72 days.

(21) Appl. No.: 13/261,602

(22) PCT Filed: Aug. 24, 2011

(86) PCT No.: PCT/EP2011/064501
§ 371 (c)(1),
(2), (4) Date: May 17, 2013

(87) PCT Pub. No.: WO2012/025547
PCT Pub. Date: Mar. 1, 2012

(65) Prior Publication Data
US 2013/0244553 A1    Sep. 19, 2013

(30) Foreign Application Priority Data

Aug. 25, 2010 (DE) .......................... 10 2010 035 526

(51) Int. Cl.
| | |
|---|---|
| B24D 11/00 | (2006.01) |
| B24B 29/00 | (2006.01) |
| B24B 13/01 | (2006.01) |
| B24B 37/22 | (2012.01) |
| B24B 37/24 | (2012.01) |
| B24D 3/00 | (2006.01) |
| B32B 7/00 | (2006.01) |
| B32B 25/02 | (2006.01) |

(52) U.S. Cl.
CPC ................. *B24B 29/00* (2013.01); *B24B 13/01* (2013.01); *B24B 37/22* (2013.01); *B24B 37/24* (2013.01); *B24D 3/002* (2013.01); *B24D 11/00* (2013.01); *B32B 7/00* (2013.01); *B32B 25/02* (2013.01)

(58) Field of Classification Search
USPC ............... 451/526, 539, 504, 505, 42; 51/298
See application file for complete search history.

(56) References Cited

U.S. PATENT DOCUMENTS 5,205,083 A *  4/1993  Pettibone ........................ 451/42
5,255,474 A    10/1993  Gaua et al.

(Continued)

FOREIGN PATENT DOCUMENTS

| DE | 102010001213 | 8/2010 |
|---|---|---|
| JP | 2004237437 | 8/2004 |
| WO | WO-2009020870 | 2/2009 |

*Primary Examiner* — Robert Rose
(74) *Attorney, Agent, or Firm* — David C. Purdue (57) ABSTRACT

The invention relates to a replaceable fine machining membrane (19) for fixing on a tool head (1), to which pressure can be applied, of a stationary fine machining tool for fine machining a workpiece surface. A fine machining means substrate (27) is integrated in the fine machining membrane (19), said fine machining membrane (19) having a crosslinked elastomer (40) and said fine machining means substrate (27) being embedded in the crosslinked elastomer (40). The invention also relates to a method for producing such a fine machining membrane (19) and to a stationary fine machining tool with a tool head (1) to which pressure can be applied and which has a removable fixing means (31) for fixing such a replaceable fine machining membrane (19). Finally, the invention relates to a method for producing the novel fine machining membrane (19). The invention allows the precise reproducible fine machining of workpiece surfaces even with highly convex or freely shaped membranes (19). Furthermore, a detaching or tearing of the fine machining means substrate (27) is prevented, and the fine machining is simplified and accelerated.

23 Claims, 4 Drawing Sheets (56) References Cited

U.S. PATENT DOCUMENTS 5,695,393 A  12/1997  Granziera
6,875,090 B2 *  4/2005  Goulet et al. .................. 451/42
6,945,849 B2  9/2005  Miyazawa
7,556,555 B2  7/2009  Feng et al.

* cited by examiner

REPLACEABLE FINE MACHINING MEMBRANE, STATIONARY FINE MACHINING TOOL, AND METHOD FOR PRODUCING A REPLACEABLE FINE MACHINING MEMBRANE

The present invention relates to a fine machining membrane according to the preamble of claim 1, to a stationary fine machining tool, in particular for the accurately reproducible fine machining of complicatedly shaped metal, glass, plastic or ceramic surfaces, and to a method for producing an exchangeable fine machining membrane.

The fine machining of workpiece surfaces, in particular of metal, glass, plastic or ceramic surfaces, comprises grinding, polishing, lapping, cutting, milling, turning or other fine machining processes and is often an accurately power-regulated or power-controlled process in which it is tremendously important to maintain an areally homogeneous and chronologically constant pressure-mechanical state in a specific fine machining zone between the fine machining means and workpiece, so that reproducible material removal conditions can be ensured. Fine machining tools with a membrane tool head are often used for this purpose. The membrane tool head has in this case a membrane, the shape of which can be adapted according to the workpiece. A fine machining means carrier is tension-mounted or glued on the mostly outwardly curved membrane and carries a fine machining means. As a result of rotational, oscillatory and/or eccentric movements of the tool head which is guided, accurately controlled by the fine machining tool, with a defined pressure force upon the workpiece surface and at a defined speed along a defined path over the workpiece surface, the workpiece surface can be fine-machined with precisely reproducible accuracy. Since the membrane having the attached fine machining means carrier is deformable, the fine machining surface can be adapted to a certain extent to the shape of the workpiece surface, so that essentially the surface of the fine machining zone remains constant. Consequently, fine machining tools with a membrane tool head enable the accurate fine machining of curved or freely shaped workpiece forms to be carried out.

DE 102 42 422 B1 discloses a method and a device for the fine machining of an optical surface of a lens, in which the optical surface is polished by means of an adaptively shaped lapping plate. The lapping plate in this case has a rigid base to which a polishing pad with a polishing means carrier is attached on the workpiece side. Between the polishing pad and the rigid base, a selectively liquefiable or solidifiable substance forms a layer which can be adapted in liquid form according to the lens contour to be polished and which can be solidified in desired form for the polishing operation.

EP 0 779 128 B1 describes a method for producing ophthalmic lenses and, in particular, a form-adaptable tool for the fine grinding/polishing of ophthalmic lenses. In this case, an essentially hemispherical bladder, the shape of which can be adapted to a surface of a lens to be polished, is attached over a first workpiece-side chamber and a second tool-side chamber which together have an essentially fixed volume, the first chamber containing a filler, such as sand, and the second chamber being enlarged by means of air pressure in order to reduce the size of the first chamber.

EP 0 804 999 B1 likewise relates to a tool for the fine grinding or polishing of ophthalmic lenses. In this case, between two membranes, a bundle of rods is arranged which transfer deformation of the first membrane to the second membrane in the longitudinal direction, and consequently the second membrane can be adapted to a lens shape to be polished.

DE 101 06 007 B1 relates to a similar tool to that known from EP 0 804 999 B1, in which the bundle of rods can be fixed axially and radially by the action of compressed air.

EP 0 971 810 B1 likewise describes a tool and method for polishing an ophthalmic lens by means of a dynamically deformable lapping plate, there being arranged under the lapping plate wave-generating means which set the lapping plate in wavy movements, so that grinding swarf is carried between the lapping plate and lens by means of the waves.

Disadvantages of the above-described known fine machining tools with a membrane tool head are that the membrane serves as a supporting surface for a fine machining means carrier and the latter has to be tension-mounted or glued on the membrane. Under high pressures and strong frictional forces between the workpiece surface and fine machining means, the fine machining means carrier is often torn open or torn off from the membrane. Moreover, the fine machining means carriers have to be cut out from sheet-like metric ware, shaped and then clamped or glued to the membrane. The bandwidth of possible surface contours of the membrane which can be fitted with a fine machining means carrier is consequently restricted. Highly curved membrane contours, above all, cannot be covered or glued with a fine machining means carrier, since the sheet-like fine machining means carrier cannot be adapted to the pronounced curvatures without creasing. Furthermore, cutting out and shaping the fine machining means carriers is time-consuming and therefore cost-intensive.

DE 44 42 181 C2 discloses an exchangeable fine machining membrane which is suitable, for example, for use in an optical polishing machine. In this case, the membrane itself can serve as a polishing means carrier. However, this does not disclose the actual material of which the membrane is to be composed when it serves at the same time as a polishing means carrier. Polishing means carriers, without further measures, are usually too porous to allow pressure regulation and are therefore not suitable as membranes.

The object of the present invention, therefore, is to provide an alternative exchangeable fine machining membrane and a fine machining tool with a membrane tool head, in which, even with highly curved membranes, workpiece surfaces can be fine-machined in an accurately reproducible way. Moreover, tearing off or tearing open of the fine machining means carrier is to be avoided and fine machining is to be simplified and accelerated.

This object is achieved, with regard to the exchangeable fine machining membrane, by means of the characterizing features of claim 1 and by means of a stationary fine machining tool according to claim 9 and also by means of a method for producing such a fine machining membrane according to claim 13.

According to a first aspect of the invention, an exchangeable fine machining membrane for fastening to a pressure-loadable tool head of a fine machining tool for the fine machining of a workpiece surface is provided, a fine machining means carrier being integrated in the fine machining membrane, and the fine machining means carrier having a crosslinked elastomer and the fine machining means carrier being embedded in the crosslinked elastomer.

"Fine machining" may be any mechanical manufacturing method according to DIN 8510, in which a material is brought to the desired shape by superfluous material being removed. This is, in particular, the grinding, polishing, reaming, lapping, cutting, shaving, rasping, milling, filing or turning of workpiece surfaces, in particular of metal, glass, plastic or ceramic surfaces. A "fine machining means carrier" is in this case a material which can carry a fine machining means, such as, for example, diamond dust or fine-grained silica sand, which serves as an abrasive. The fine machining means carrier may carry a fine machining means even before the fastening of the fine machining membrane or the fine machining means can be attached to the fine machining means carrier before or during the fine machining process.

The term "stationary fine machining tool" means here that the fine machining tool has a defined spatial position in relation to the workpiece and, for example, is not held in the hand. However, a stationary fine machining tool may have parts which are movable and/or rotatable in relation to the workpiece. The workpiece may also be movable and/or rotatable in relation to the fine machining tool. One example of a stationary fine machining tool is a fixed polishing spindle with a rotatable spindle arm.

According to the invention, the fine machining membrane with the integrated fine machining means carrier constitutes a one-piece composite article which can be produced with virtually any desired curvature. Moreover, tearing off or tearing open is prevented as a result of the integration of the fine machining means carrier.

By the fine machining carrier being integrated in the fine machining membrane, the fine machining membrane can be used as an exchangeable disposable article. In contrast to the fine machining tools known in the prior art, in which the membrane is integrated permanently in the tool and only the fine machining means carrier becomes worn and is exchanged, according to the invention the fine machining membrane is exchanged together with the integrated fine machining means carrier. This simplifies and accelerates fine machining tremendously, since it is not necessary to cut out, shape and glue a sheet-like fine machining means carrier does not have to be to the membrane.

A further advantage of the fine machining membrane according to the invention is that it can be configured more thinly and therefore more flexibly as a result of the integration of the fine machining means carrier. The pressure force of the fine machining membrane upon a workpiece surface consequently corresponds to the regulatable internal pressure in the pressure space of the tool head. The pressure force can therefore be regulated exactly via the internal pressure. In the known fine machining membranes, the glued-on fine machining means carrier leads to increased rigidity and thickness, so that the pressure force is indefinably higher than the internal pressure. The pressure force therefore cannot be regulated exactly via the internal pressure in the pressure space of the tool head by means of the known fine machining membranes.

Preferably, the fine machining membrane has a fabric ply embedded in the crosslinked elastomer. By means of the fabric ply, the fine machining membrane is appreciably strengthened, and it is ensured, even if the membrane has relatively low thickness, that the fine machining membrane maintains its contour even when the tool head is loaded with high pressure. By the fine machining means carrier being embedded into the elastomer, the most diverse possible fine machining means carriers, such as, for example, felt, PU foam, artificial silk or Nylon material, can be integrated into the membrane in a materially integral way and so as to be proof against being torn off, without adapted connection means having to be used in each case.

"Elastomer" is understood here to mean any plastic which is dimensionally stable at room temperature, but is elastically deformable, and which is deformed elastically under tensile and/or compressive loads, but subsequently returns to its original undeformed configuration again automatically. However, under specific conditions, such as, for example, a temperature above room temperature, an elastomer may be flowable. The "crosslinking" of a flowable elastomer is understood here to mean an interlinking of molecules of a flowable elastomer to form a three-dimensional network, so that the elastomer becomes dimensionally stable, but elastically deformable. This may be, for example, a vulcanization in which a crosslinking agent, such as, for example, sulfur, and/or catalysts are used. However, self crosslinking, as it is known, may also be achieved solely as a result of specific external reaction conditions, such as, for example, the action of heat and/or of pressure.

Preferably, the fabric ply of the fine machining membrane is embedded in the crosslinked elastomer on the tool side and the fine machining means carrier is embedded in the crosslinked elastomer on the workpiece side. "Workpiece side" is understood here to mean the side which is intended, for the intended use, to face a workpiece to be machined. "Tool side" is understood here to mean the side which is intended, for the intended use, to face a fine machining tool.

It is preferable, furthermore, that the fine machining membrane has a central fine machining portion, the workpiece-side surface of the fine machining portion being shaped convexly and the tool-side surface of the fine machining portion being shaped concavely. As a result, the membrane acquires essentially the form of a shell which is shaped spherically or otherwise so as to be curved outward from the tool and which on the inside can delimit a pressure space which can be pressure-loaded, for example, by a regulated fluid pressure. The pressure space may in this case be pressure-loaded by a fluid, such as, for example, air, water or oil. Alternatively, a bundle of rods or other suitable means may also exert a multiplicity of tool-side pressure points upon the fine machining membrane. The fine machining means carrier is integrated on the outside, so that this, together with a fine machining means attached to it, can be brought frictionally into contact with a workpiece surface, which, if appropriate, may also be curved concavely, for the fine machining of said workpiece.

Preferably, the fine machining membrane has an annularly peripheral fastening rabbet which also has the function of a sealing ring. The fastening of the exchangeable fine machining membrane consequently becomes especially simple. There is therefore no need for any additional sealing ring. The fine machining membrane may be configured to be air-tight or be air-permeable to a limited extent, although the fine machining membrane must make it possible to maintain a constant internal pressure, that is to say must be "pressure-tight".

The elastomer preferably has at least one rubber from the group which is composed of: epichlorohydrin rubber (ECO), ethylenepropylenediene rubber (EPDM), nitrile rubber (NBR), butyl rubber (IIR), fluoro rubber (FPM), polyester/ether-polyurethane rubber (PUR), ethylenevinylacetate rubber (EVA).

These rubbers are suitable elastomer basic materials so that the necessary elasticity or rigidity and tear strength of an exchangeable fine machining membrane can be achieved.

The fabric ply preferably has at least one substance from the group which is composed of: polyethersulfone (PES), polyamide (PA). These plastics, in the form of fibers, can, form the basic material for a flexible, but tear-resistant fabric web, from which the fabric ply can be separated.

In order to obtain a greater thickness and/or strength of the fine machining membrane, the fine machining membrane may have two or more fabric plies and/or elastomer layers. In this case, the fabric plies may be embedded in an elastomer layer, or a plurality of elastomer layers may be crosslinked with one another each having one or more fabric plies. In this embodiment, too, the fine machining membrane is a one-piece composite article.

The fine machining membrane may have on its side facing the workpiece structures which can improve the distribution of the machining suspension. These structures may be, for example, slots or grooves or the like which may be incorporated into the fine machining membrane even during the shaping of the latter, for example in a deep-drawing process. It is also possible, however, to introduce the structures subsequently. The structures may be, for example, spiral, in which the case the spiral may commence, for example, in the center of the membrane, that is to say at its pole, and the spiral arm runs with an increasing radius around this pole. A plurality of spirals may also be provided. Alternative structures, such as, for example, meridionally or otherwise running slots or grooves, may likewise be envisaged. Structures with different geometries may also be incorporated simultaneously into the fine machining membrane.

Furthermore, it is conceivable to incorporate a defined permeability or porosity for the suspension agent into the fine machining membrane. The suspension medium could in this case be at the same time the pressure medium, and the process zone is supplied with suspension at least also from inside outward.

In a further advantageous embodiment, a centering ring may be provided, to which the fine machining membrane is connected. The centering ring can serve for the better positioning of the fine machining membrane with respect to the tool basic body. The centering ring can be fixed to the fine machining membrane during the process of shaping the latter. The ring may be composed of plastic or metal, for example aluminum, steel or brass. The material must be suitable for tolerating the shaping temperatures during the process of producing the fine machining membrane, for example 200° C. The centering ring may, for example, be L-shaped with a cylindrical piece and with a radial piece. An inner face of the cylindrical piece may serve for centering, while a lower face of the radially extending radial piece may serve as a sealing surface. The outer face of the cylindrical piece and/or the upper face of the radial piece may serve for fixing the fine machining membrane. The sealing surface may serve at the same time for the axial positioning of the fine machining membrane.

According to a second aspect of the present invention, a fine machining tool with a pressure-loadable tool head is provided, which has a releasable fastening means for fastening an above-described exchangeable fine machining membrane. A "releasable fastening means" is understood here to mean any fastening means which is configured for fastening an exchangeable fine machining membrane for fine machining to the tool head and for releasing said fine machining membrane for exchange purposes.

The tool head of the fine machining tool is therefore adapted to the exchangeable fine machining membrane. For a fine machining membrane having a different diameter, it may be advantageous if the tool head itself is fastened exchangeably to the fine machining tool, so that a correspondingly matching tool head can easily be used for the fine machining membrane with a different diameter.

Preferably, the tool head delimits on the tool side a pressure space which, with the fine machining membrane fastened, is delimited on the workpiece side by the fine machining membrane. The pressure space can in this case advantageously be pressure-loaded on the tool side via a pressure line. The fastening means is in this case preferably configured for fastening the fine machining membrane to the tool head continuously along the circumference in a pressure-tight and non-slip manner. Preferably, this fastening means is a union nut which can be manually screwed onto the tool head and unscrewed and which by means of an annular inner flange presses an annularly peripheral fastening rabbet of the fine machining membrane, said rabbet also having the function of a sealing ring, sealingly onto an annular sealing edge on the tool head.

According to a third aspect of the present invention, a method for producing an above-described exchangeable fine machining membrane is provided, having the following steps:
wetting of a fabric ply with a flowable elastomer,
attachment of a fine machining means carrier to the flowable elastomer wetting the fabric ply,
crosslinking of the flowable elastomer wetting the fabric ply, so that the elastomer is solidified and in this case the fabric ply and the fine machining means carrier are embedded in the elastomer.

Preferably, the fabric ply is initially present as a fabric web which is transported in the longitudinal direction via a roller-type conveyor unit, the fabric web being wetted during transport with the flowable elastomer, and the fine machining means carrier being laminated in the form of a web onto the flowable elastomer in order to obtain a membrane web. This makes it possible to carry out rapid, cost-effective and homogeneous serial production of fine machining membranes. It is advantageous in this case, before the fine machining means carrier is laminated on, to distribute the flowable elastomer on the fabric web in an areally homogeneous way and in controlled thickness by means of a wiper, roller and/or doctor blade, in order to obtain a defined and homogeneous thickness of the membrane web. After the fine machining means carrier has been laminated on, the flowable elastomer wetting the fabric web is preferably crosslinked by means of pressure and temperature rollers preferably at 150° C. to 200° C. Preferably, the fine machining membrane is subsequently form-stamped from the membrane web and separated out, for example cut out or punched out. Form-stamping is in this case preferably carried out by means of a stamping die and preferably at a temperature of 150° C. to 200° C. By the form-stamping of the fine machining membrane present as a one-piece composite article, highly pronounced curvatures of the fine receiving membrane can be implemented, without in this case having to fear that the fine machining means carrier creases or tears open or tears off during fine machining.

Completion of crosslinking may occur during the form-stamping operation. It was shown that the first crosslinking step does not necessarily lead to a complete crosslinking, but instead to a degree of crosslinking of, for example, 80%. Complete crosslinking can then be achieved, for example, at the given temperatures during form-stamping. Complete crosslinking is advantageous for the dimensional stability of the fine machining membrane.

Depending on the desired thickness and/or rigidity of the fine machining membrane, two or more fabric plies may be wetted with flowable elastomer. In this case, the fabric plies may be wetted together or they are wetted in each case individually or in groups, and the corresponding elastomer layers are subsequently crosslinked with one another. However, in this embodiment of the production method, too, the fine machining membrane is produced as a one-piece composite article.

By means of the fine machining membrane according to the invention, a method for the fine machining of at least one workpiece, having the following steps, can be carried out:
fastening of a first exchangeable fine machining membrane to a tool head on a fine machining tool, so that the fine machining membrane, in the fastened state, closes off, pressure-tight, on the workpiece side a pressure-loadable pressure space of the tool head, loading of the pressure space with pressure, fine machining of the at least one workpiece in a first fine machining step, exchange of the first exchangeable fine machining membrane by a second exchangeable fine machining membrane, loading of the pressure space with pressure, and fine machining of the at least one workpiece in a second fine machining step.

In contrast to known fine machining methods in which the fine machining membrane is not exchanged between two fine machining steps, but instead is connected fixedly to the fine machining tool, the exchangeable fine machining membrane itself is exchanged, for example when the fine machining means carrier becomes worn. This is considerably quicker and more cost-effective and makes it possible to have a greater bandwidth of usable contours of fine machining membranes, in particular of fine machining membranes with pronounced curvature. The fine machining membrane may also be exchanged together with the tool head manually or in an automated way, so that different sizes and/or shapes of fine machining membranes can be employed.

Preferably, during the first and/or the second fine machining step, the internal pressure in the pressure space is kept constant by means of pressure regulation, and the size of the surface which is in contact with a workpiece to be machined is regulated by regulating the distance between the workpiece surface and tool head and/or the pressure force of the fine machining membrane upon the workpiece surface. The size of the fine-machined area of the workpiece surface can consequently be dynamically adapted correspondingly, without the pressure force upon the workpiece and consequently the material removal intensity being varied.

The invention is explained in more detail below by means of the accompanying figures which show a preferred embodiment of the invention. What can be seen in particular in the figures is.

Figure 1A:
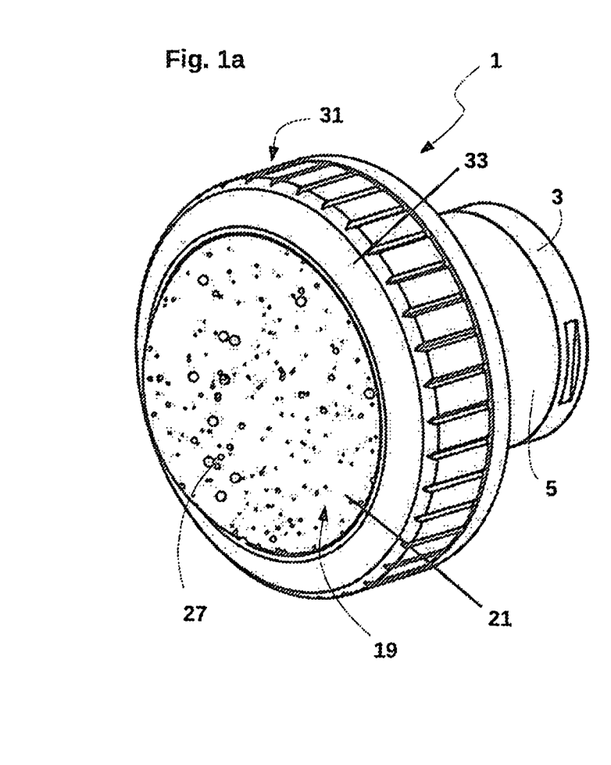
FIG. 1a: A perspective view of a preferred embodiment of a tool head of a fine machining tool with a preferred embodiment of a fastened exchangeable fine machining membrane.
Figure 1B:
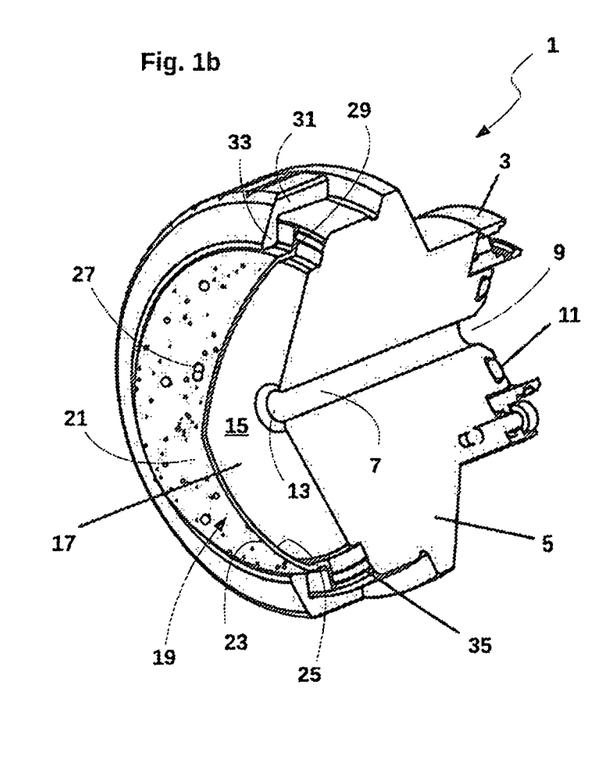
FIG. 1b: A perspective view, with a sector cut out, of a preferred embodiment of a tool head of a fine machining tool with a preferred embodiment of a fastened exchangeable fine machining membrane.

FIGS. 1a and 1b show a tool head 1 of a fine machining tool (not shown), the tool head 1 having on the tool side a releasable fastening device 3 for fastening the tool head 1 to a stationary fine machining tool, such as, for example, a polishing spindle or another polishing machine. Moreover, the tool head 1 has an essentially rotationally symmetric basic body 5 which has a continuous pressure line 7 along its longitudinal axis. The tool-side end 9 of the pressure line 7 is surrounded by an O-ring seal 11, so that the pressure line 7 can be connected, air-tight, to a pressure source of a fine machining tool. The other, workpiece-side end 13 of the pressure line 7 issues on a workpiece-side end face 15 of the basic body 5 into a pressure space 17 which is delimited on the tool side by the end face 15 of the basic body 5.

The pressure space 17 is delimited on the workpiece side by a fine machining membrane 19 fastened to the tool head 1. The fine machining membrane 19 has a central shell-shaped fine machining portion 21, the diameter of which corresponds essentially to the diameter of the end face 15 of the basic body 5 of the tool head 1. The workpiece-side surface 23 of the fine machining portion 21 is shaped convexly and the tool-side surface 25 of the fine machining portion 21 is shaped concavely. On the convex surface 23 of the fine machining portion 21, a fine machining means carrier 27 is integrated in the fine machining membrane 19.

The fine machining membrane 19 has on the circumference an annularly peripheral L-shaped fastening rabbet 29 which also has the function of a sealing ring. The fastening rabbet 29 is fastened to the tool head 1 continuously along the circumference in a pressure-tight and non-slip manner by means of a union nut 31 screwed or clamped on the basic body 5. The union nut 31 has, for this purpose, an inner flange 33 which presses the fastening rabbet 29 sealingly onto a sealing edge 35 running annularly on the basic body 5.

The pressure space 17 is consequently closed off, pressure-tight, and can be loaded with a fluid, such as, for example, air, water or oil, with regulated pressure by a fine machining tool via the pressure line 7. A homogeneous constant pressure profile is consequently achieved over the area of the fine machining portion 21 of the fine machining membrane 19.

As a result of the lateral movement, oscillation and/or rotation of the tool head 1 by means of a fine machining tool in relation to a surface of a workpiece (not shown) or the movement, oscillation and/or rotation of a workpiece in relation to the tool head 1, the workpiece surface can be fine-machined with precisely reproducible accuracy when there is a defined pressure force between the fine machining membrane 19 and a workpiece, the pressure force corresponding to the regulated internal pressure in the pressure space 17. In this case, the tool head 1 may be oriented orthogonally offset or at an angle to the workpiece surface.

During the fine machining, the size of the fine-machined area can be regulated via the distance of the tool head 1 from the workpiece surface and/or via the pressure force of the fine machining membrane 19 upon the workpiece surface if the internal pressure in the pressure space 17 is kept constant by pressure regulation. The size of the fine-machined area of the workpiece surface can consequently be dynamically adapted correspondingly, without the pressure force upon the workpiece and consequently the material removal intensity being varied.

Figure 2:
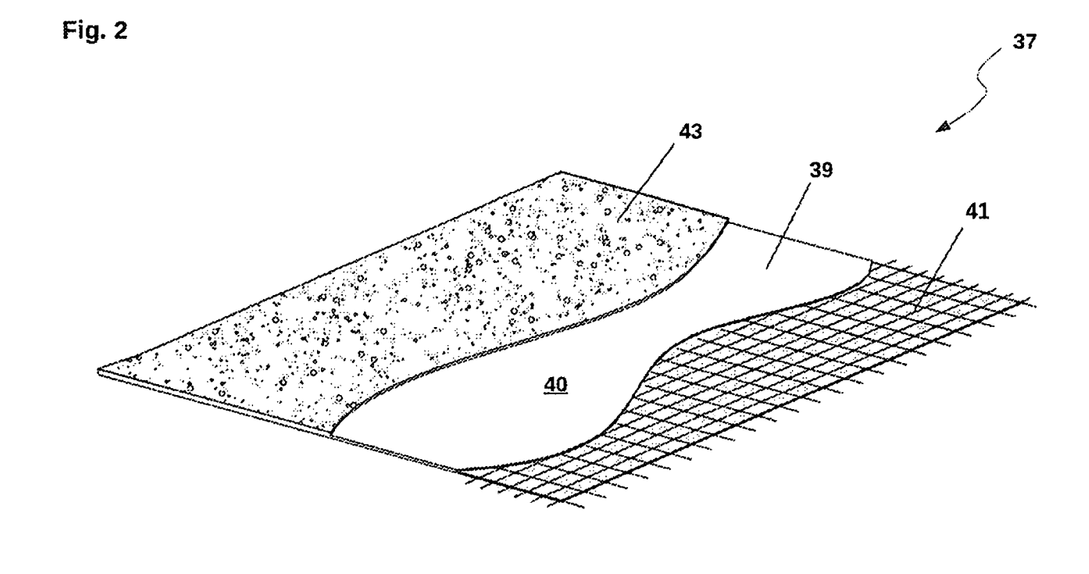
FIG. 2: A diagrammatic illustration of the components of a membrane web for producing a fine machining membrane.

FIG. 2 shows diagrammatically the set-up of a membrane web 37, from which the fine machining membrane 19 is form-stamped and separated out in subsequent steps of a preferred embodiment of the production method. The membrane web 37 has a fabric web 41 embedded on the underside in an elastomer layer 39. On the topside, a web 43 of a fine machining means carrier 27 is embedded into the layer 39 of an elastomer 40. The underside corresponds later to the tool side which delimits the pressure space 17. The topside corresponds to the workpiece side, on which a fine machining means is attached and which is brought into frictional contact with a workpiece during fine machining.

Figure 3:
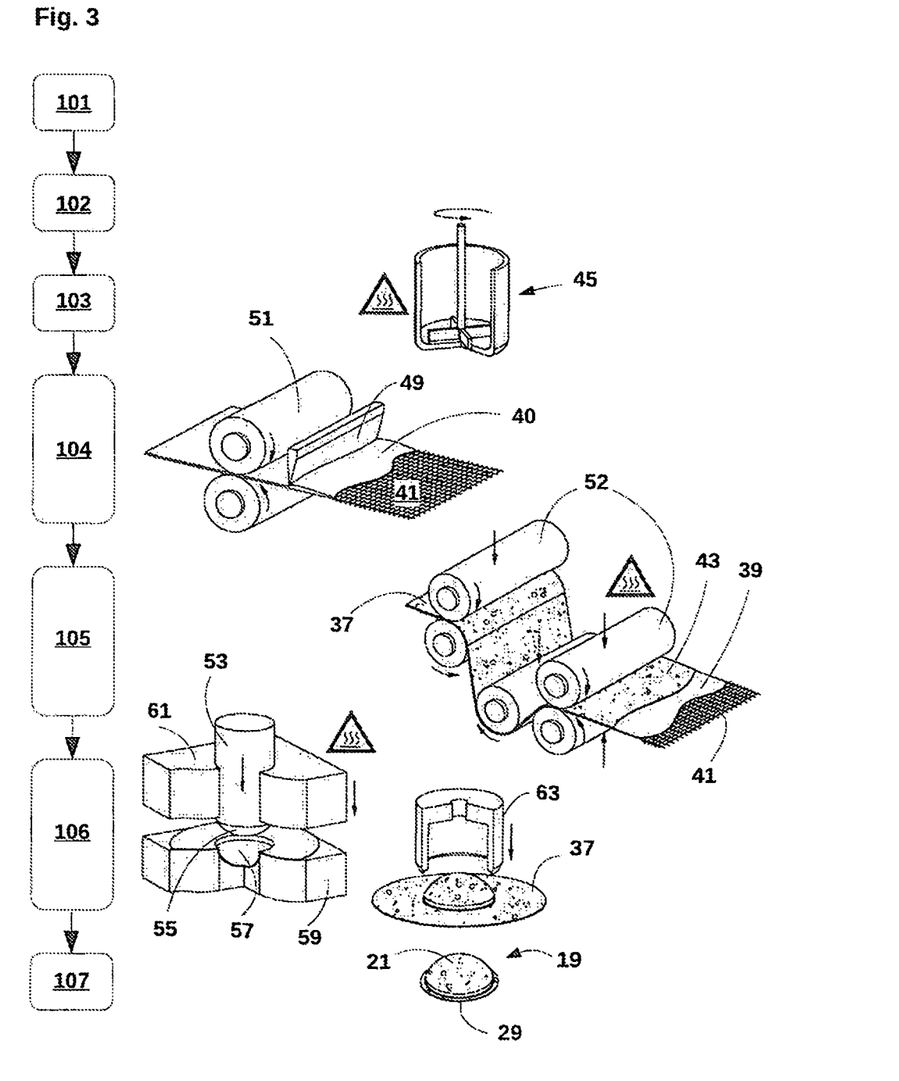
FIG. 3: A diagrammatic illustration of a preferred embodiment of the method according to the invention for producing a fine machining membrane.

FIG. 3 shows diagrammatically a preferred embodiment of the method for producing the fine machining membrane 19. Initially, in a first step 101, a rubber, such as, for example, epichlorohydrin rubber (ECO), ethylene propylenediene rubber (EPDM), nitrile rubber (NBR), butyl rubber (IIR), fluoro rubber (FPM), polyester/ether-polyurethane rubber (PUR) and/or ethylenevinylacetate rubber (EVA), is provided as raw material. Subsequently, in step 102, the raw material is granulated to a particle size of a few millimeters. In a mixing step 103, the granulate is mixed with a crosslinking agent and with a solvent and is blended in a mixer 45 at a process temperature of approximately 50° C. In this case, a flowable elastomer 40 is obtained, which is applied in a doctor step 104 uniformly and with defined thickness by means of a doctor blade 49 to a fabric web 41 which is thus wetted with the flowable elastomer 40. In this case, the fabric web 41 is transported along its longitudinal axis by means of a roller-type conveyor unit 51.

In a subsequent crosslinking and laminating step 105, the flowable elastomer 40 wetting the fabric web 41 is laminated with a web 43 of a fine machining means carrier 27. In this case, no connection means is used, but instead only the web 43 of a fine machining means carrier 27 is applied to the still flowable elastomer 40. The flowable elastomer 40 is solidified via a system 52 of pressure and temperature rollers, which compresses the membrane web 37 with a pressure of 100 to 200 bar and has a process temperature of 150° C. to 200° C., with the result that the fabric web 41 and the web 43 of the fine machining means carrier 27 are embedded in the elastomer 40.

Subsequently, in a stamping and separating-out step 106, the membrane web 37 thus obtained as a one-piece composite article in the form of metric ware is pressed by means of a stamping die 53 having a convex stamping surface 55 into an essentially concave stamping surface 57 of an underlying molding 59. In this case, a holding-down device 61 holds the membrane web 37 circumferentially, around the stamping die 53, on the underlying molding 59 in a non-slip manner. During form-stamping, a process temperature of 150° C. to 200° C. acts upon the membrane web 37, so that the latter can be adapted to the convex stamping surface 55 of the stamping die 53 or the concave stamping surface 57 of the underlying molding 59 and assumes a corresponding shape. Subsequently, by means of a punching ring 63, the fine machining membrane 19 is punched out of the form-stamped membrane web 37. During the stamping and separating-out step 106, an L-shaped fastening rabbet with a cylindrical portion and with an annular portion is obtained circumferentially.

In a last checking step 107, the overall height, the bead height and the diameter of the fine machining portion 21 are measured, and the check is made as to whether the values lie within tolerance limits. The bead height in this case designates the length of the cylindrical portion of the fastening rabbet 29.

Figure 4:
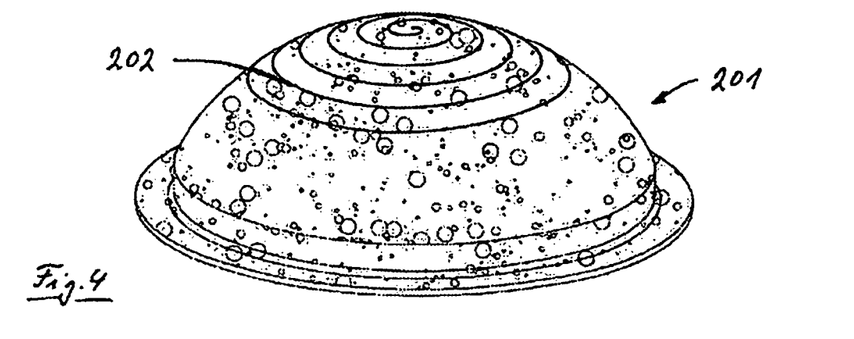
FIG. 4: A perspective view of a fine machining membrane with a spiral structure on the surface.

FIG. 4 shows a ready-shaped fine machining membrane 201, the surface of which has a spiral structure 202 on the side facing the workpiece, not illustrated here. This structure 202 is a narrow groove in the membrane surface, which groove can positively influence the distribution of a machining suspension during the machining process. The structure 202 can be introduced during the forming of the fine machining membrane 201, for example during a deep-drawing process. The structure may already be provided in the stamping surface 57 of the molding 59 (see FIG. 3). Subsequent introductions of the structure 202, for example by means of a die or punch, may likewise be envisaged. Alternative structural forms and combinations of a plurality of structures, for example meridionally running slots or grooves, may also be provided.

Figure 5:
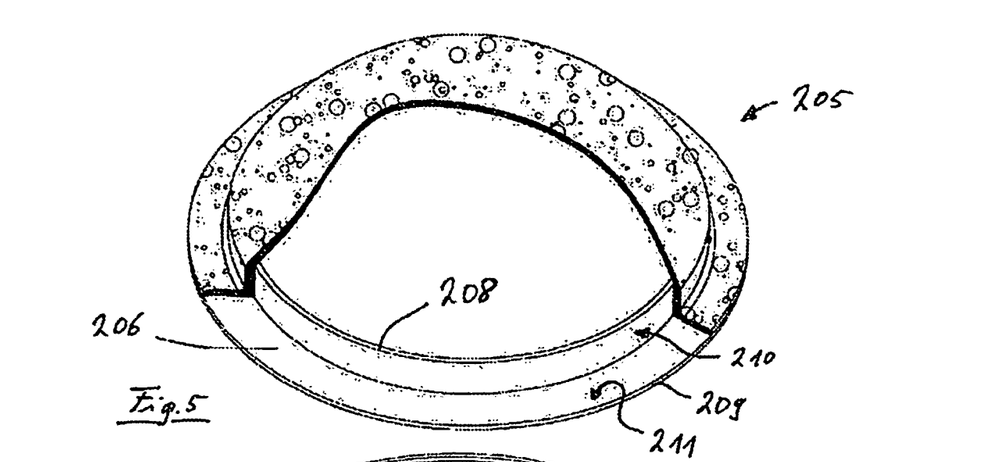
FIG. 5: A perspective view of a further fine machining membrane with a sector cut out together with a centering ring.

FIG. 5 shows a further fine machining membrane 205 together with a centering ring 206 which is illustrated in perspective from below in FIG. 6. The centering ring 206 is provided for the better positioning of the fine machining membrane 205 with respect to the tool basic body 5 (see FIGS. 1a and 1b). The centering ring 206 can be introduced into the fine machining membrane 205 during the process of shaping the latter. For this purpose, the centering ring 206 can be introduced into the molding 59 (see FIG. 3). The centering ring 206 is essentially L-shaped with a surface area 207, serving for centering, on the inside of a cylindrical piece 208 and with a radial piece 209 extending outward from this at right angles. Contact faces 210 and 211 of the cylindrical piece 208 and of the radial piece 209, respectively, may be structured in a suitable way in order to increase adhesion between the centering ring 206 and the fine machining membrane 205.

Figure 6:
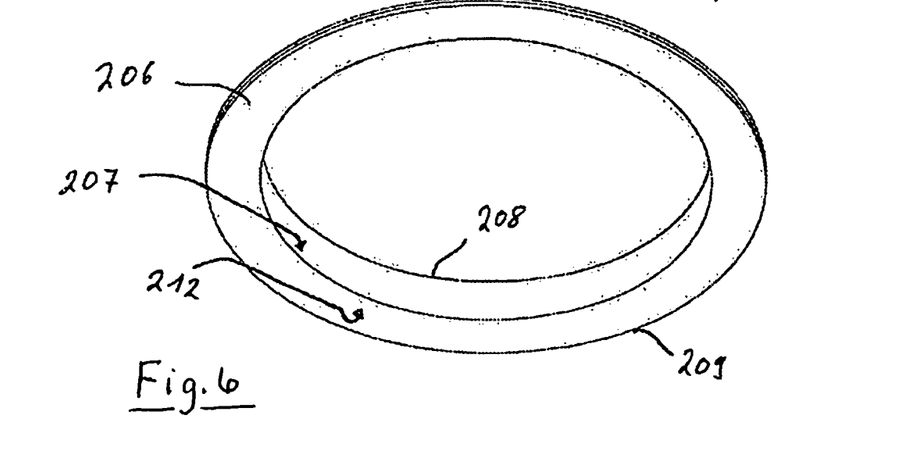
FIG. 6: A bottom perspective view of a centering ring.

FIG. 6 shows the centering ring 206 in a view of a sealing surface 212 of the radial piece 209, said sealing surface serving at the same time for the axial positioning of the fine machining membrane 206.

The present invention makes it possible, even with highly curved membranes (19), to be able to fine-machine workpiece surfaces in an accurately reproducible way. Furthermore, tearing off or tearing open of the fine machining means carrier (27) is avoided and fine machining is simplified and accelerated.

The invention claimed is:

1. An exchangeable fine machining membrane (19) for fastening to a pressure-loadable tool head (1) of a stationary fine machining tool for the fine machining of a workpiece surface, the fine machining membrane being pressure-tight for a fluid, characterized in that a fine machining means carrier (27) is integrated in the fine machining membrane (19), the fine machining membrane (19) having a crosslinked elastomer (40) and the fine machining means carrier (27) being embedded in the crosslinked elastomer (40).

2. The exchangeable fine machining membrane as claimed in claim 1, characterized by a fabric ply embedded in the crosslinked elastomer.

3. The exchangeable fine machining membrane (19) as claimed in claim 2, said fine machining membrane having a tool side and a workpiece side, said fabric ply being embedded in the crosslinked elastomer (40) on said tool side and said fine machining means carrier (27) being embedded in the crosslinked elastomer (40) on said workpiece side.

4. The exchangeable fine machining membrane (19) as claimed in claim 1, with a central fine machining portion (21) having a workpiece-side surface and a tool-side surface, said workpiece-side surface (23) of the fine machining portion (21) being shaped convexly and said tool-side surface (25) of the fine machining portion (21) being shaped concavely.

5. The exchangeable fine machining membrane (19) as claimed in claim 1, the fine machining membrane (19) having an annularly peripheral fastening rabbet (29) which also has the function of a sealing ring.

6. The exchangeable fine machining membrane (19) as claimed in claim 1, the elastomer (40) having at least one rubber from the group which is composed of: epichlorohydrin rubber (ECO), ethylenepropylenediene rubber (EPDM), nitrile rubber (NBR), butyl rubber (IIR), fluoro rubber (PPM), polyester based polyurethane rubber (PUR), polyether based polyurethane rubber (PUR), ethylenevinylacetate rubber (EVA).

7. The exchangeable fine machining membrane (19) as claimed in claim 2, the fabric ply having at least one substance from the group which is composed of: polyethersulfone (PES), polyamide (PA).

8. The exchangeable fine machining membrane (19) as claimed in claim 2, the fine machining membrane (19) having at least two fabric plies.

9. A stationary fine machining tool with a pressure-loadable tool head (1) which has a releasable fastener means (31) and an exchangeable fine machining membrane (19), said fine machining membrane being pressure-tight for a fluid, characterized in that a fine machining means carrier (27) is integrated in the fine machining membrane (19), the fine machining membrane (19) having a crosslinked elastomer (40) and the fine machining means carrier (27) being embedded in the crosslinked elastomer (40); wherein said releasable fastener is operable to releasably fasten said exchangeable fine machining membrane (19) to said pressure-loadable tool head (1).

10. The stationary fine machining tool as claimed in claim 9, characterized by a fabric ply embedded in the crosslinked elastomer.

11. The stationary fine machining tool as claimed in claim 10, the fabric ply being embedded in the crosslinked elastomer (40) on the tool side and the fine machining means carrier (27) being embedded in the crosslinked elastomer (40) on the workpiece side.

12. The stationary fine machining tool as claimed in claim 9, the fine machining membrane (19) having an annularly peripheral fastening rabbet (29) which also has the function of a sealing ring.

13. The stationary fine machining tool as claimed in claim 9, the tool head (1) delimiting on the tool side a pressure space (17) which, with the fine machining membrane (19) fastened, is delimited on the workpiece side by the fine machining membrane (19).

14. The stationary fine machining tool as claimed in claim 13, the pressure space (19) being pressure-loadable on the tool side via a pressure line (7).

15. The stationary fine machining tool as claimed in claim 9, the fastening means (31) being configured for fastening the fine machining membrane (19) to the tool head (1) continuously along the circumference in a pressure-tight and non-slip manner.

16. A method for producing an exchangeable fine machining membrane, having the following steps:
    wetting (104) of a fabric ply with a flowable elastomer (40),
    attachment (105) of a fine machining means carrier (27) to the flowable elastomer (40) wetting the fabric ply,
    crosslinking (105) of the flowable elastomer (40) wetting the fabric ply, so that the elastomer (40) is solidified and in this case the fabric ply and the fine machining means carrier (27) are embedded in the elastomer (40).

17. The method as claimed in claim 16, the fabric ply initially being present as a fabric web (41) which is transported in the longitudinal direction via a roller-type conveyor unit (51), the fabric web (41) being wetted during transport with the flowable elastomer (40), and the fine machining means carrier (27) being laminated (105) in the form of a web (43) onto the flowable elastomer (40) in order to obtain a membrane web (37).

18. The method as claimed in claim 17, the flowable elastomer (40) being distributed on the fabric web (41) in an areally homogeneous manner and in controlled thickness by means of a wiper, a roller, or a doctor blade (49) before the fine machining means carrier (27) is laminated on (105).

19. The method as claimed in claim 17, the flowable elastomer (40) wetting the fabric web (41) being crosslinked by means of a system (52) of pressure and temperature rollers after the fine machining means carrier has been laminated on (105).

20. The method as claimed in claim 17, the fine machining membrane (19) being form-stamped from the membrane web (37) and being separated out (106).

21. The method as claimed in claim 20, form-stamping (106) being carried out by means of a stamping die (53) at a temperature of 150° C. to 200° C.

22. The method as claimed in claim 16, the flowable elastomer (40) being crosslinked at a temperature of 150° C. to 200° C.

23. The method as claimed in claim 16, two or more fabric plies (41) being wetted with flowable elastomer (40), depending on the desired thickness and/or rigidity of the fine machining membrane (19).

\* \* \* \* \*